(12) United States Patent
Zafiroglu

(10) Patent No.: US 7,497,978 B2
(45) Date of Patent: Mar. 3, 2009

(54) PROCESS FOR ABRASION-RESISTANT NEEDLE-PUNCHED COMPOSITE

(75) Inventor: Dimitri Peter Zafiroglu, Centreville, DE (US)

(73) Assignee: DZS, LLC., Midlothian, VA (US)

( * ) Notice: Subject to any disclaimer, the term of this patent is extended or adjusted under 35 U.S.C. 154(b) by 100 days.

(21) Appl. No.: 11/284,377

(22) Filed: Nov. 18, 2005

(65) Prior Publication Data

US 2006/0105664 A1  May 18, 2006

Related U.S. Application Data

(63) Continuation-in-part of application No. 10/611,769, filed on Jul. 1, 2003.

(51) Int. Cl.
*B29C 43/00* (2006.01)

(52) U.S. Cl. ........................ 264/162; 264/155; 264/319

(58) Field of Classification Search ........................ None
See application file for complete search history.

(56) References Cited

U.S. PATENT DOCUMENTS

| | | |
|---|---|---|
| 3,186,886 A | 6/1965 | Etchison et al. |
| 3,245,854 A | 4/1966 | Etchison et al. |
| 3,819,465 A | 6/1974 | Parsons et al. |
| 4,298,643 A | 11/1981 | Miyagawa et al. |
| 4,773,238 A | 9/1988 | Zafiroglu |
| 4,876,128 A | 10/1989 | Zafiroglu |
| 5,075,142 A | 12/1991 | Zafiroglu |
| 6,063,473 A | 5/2000 | Zafiroglu |
| 2004/0191470 A1 | 9/2004 | Zafiroglu et al. |

FOREIGN PATENT DOCUMENTS

JP  63-111050  5/1988

OTHER PUBLICATIONS

International Search Report and Written Opinion of the International Searching Authority.

*Primary Examiner*—Monica A Huson
(74) *Attorney, Agent, or Firm*—The H.T. Than Law Group

(57) ABSTRACT

A process for making abrasion-resistant composites is disclosed. The process comprises the steps of providing a fibrous sheet containing a high density of relatively short staple fibers having a decitex under 6.6; needle-punching the staple layer and applying an adhesive containing layer; followed by the application of heat and pressure to the composite to form a thin consolidated and abrasion-resistant back-face layer on the composite. Preferably, the adhesive layer is penetrated by the needled fibers during the needling step and the product is shrunk in area by 20-50% before the consolidation step. Also optionally, the consolidated layer is abraded or perforated to create micro-pores that are permeable to gases and capable of containing liquids under low-to-moderate pressures.

32 Claims, 4 Drawing Sheets

PROCESS FOR ABRASION-RESISTANT NEEDLE-PUNCHED COMPOSITE

CROSS-REFERENCE TO RELATED APPLICATIONS

The present application is a continuation-in-part of copending U.S. patent application Ser. No. 10/611,769, filed Jul. 1, 2003, which is incorporated herein by reference in its entirety.

FIELD OF THE INVENTION

The present invention relates to a process for producing needle-punched and resin-reinforced fibrous sheets for use in abrasion-resistant applications, including, but not limited to, footwear, luggage, seat covers, and floor or wall coverings.

BACKGROUND OF THE INVENTION

It is known to combine various woven, knit or nonwoven fabrics with plastic sheets or resin layers or to impregnate them with resins to form composite sheets primarily intended for use in thermoforming and molding processes. For example, U.S. Pat. No. 5,075,142, to Zafiroglu and Japanese patent application publications 63-111050 and 63-162238 disclose such composite sheets. U.S. Pat. No. 4,298,643, to Miyagawa et al. discloses a particular fabric having an exposed pile layer, the back of the fabric being bonded or laminated to a thermoplastic sheet. Such composites, however, are not as suitable for use in certain abrasive resistant articles, such as athletic shoe parts, luggage corners and surface layers, protective work clothes, certain heavy-duty sacks and the like.

Pile fabrics, such as velvets, velours, terry cloths, moquettes, tufted fabrics, and the like, each have a surface layer in which fibers are generally vertical to the surface of the fabric. Certain stitch-bonded fabrics, in which a fibrous layer is contracted and buckled by means of elastic threads attached to the fibrous layer to form a layer of pile-like groups of fibers, are disclosed by U.S. Pat. Nos. 4,773,238 and 4,876,128 to Zafiroglu. Needle-punched fabrics are also known to have fibers forced into the direction normal to the sheet by the needles. Some of these pile-like fabrics are incorporated into composite sheets. As one example, coarse carpet fibers are needle-punched into felts and stabilized with adhesive applied on their back-face, to be used as trunk liners, low-cost floor coverings and other similar uses, with the adhesive-coated back face being laid down and the upper face used as a carpet like surface. In another example, in which the coated face is used facing up as an abrasion resistant surface, Japanese laid-open patent applications 64-85614 and 64-85615 disclose a floor mat, which includes a tufted-monofilament pile, having an 8 mm height and a 0.08 g/cm$^3$ pile fiber concentration, onto which a rubber resin is sprayed. The combination of the pile fiber and resin comprises about 38% by weight of resin and has an average density of only 0.13 g/cm$^3$. Higher density of fibers, higher weight of resin per unit volume, and higher resistance to planar and compression deformation were found to be needed by subsequent art to achieve high resistance to abrasion.

U.S. Pat. No. 6,063,473 entitled "Abrasion-Resistant Composite Sheet" to Zafiroglu discloses denser, more stable and relatively thin pile or pile-like fabrics immobilized with resin to make abrasion-resistant composite sheet. The sheet comprises an upper outer surface, a lower surface, and a planar fibrous network located between and substantially parallel to the upper and lower surfaces. This composite sheet further comprises pile-like fibers that loop through the planar fibrous network and protrude generally perpendicularly from the planar fibrous network extending to the upper outer surface of the composite sheet, and a resin that immobilizes the pile-like fibers in a position generally vertical to the planar fibrous network. The resin extends through the stratum of pile-like fibers from the upper outer surface to a depth of at least 0.5 mm, and more preferably throughout the composite. The composite has a planar stretchability of no greater than 25%, and a vertical compressibility of no more than 25%. Typically, the composite sheet comprises in the range of 30 to 90 percent resin, preferably at least 50% and most preferably at least 70%, based on the total weight of the composite. Typically, the composite sheet exhibits a 40-grit Wyzenbeek abrasion wear of no more than 50 microns per 1000 cycles. This composite is relatively expensive and stiff due to the relatively high resin density within a relatively thick layer which is required to stabilize the vertical orientation of the fibers within the face layer, and to limit the extensibility and compressibility of the sheet.

United States published patent application 2004/0191470 A1, Ser. No. 10/403,208 describes a fibrous product wherein the fibers of a web are positioned in a pile-like configuration normal to the plane of the web, and wherein the web contains uniformly distributed low-melt resin or adhesive, which is activated "in-situ". The resin may be in the form of binder fibers, co-spun low-melt/high-melt fibers, or powders. A densified resin-fiber rich skin is formed on the pile-like surface by applying heat and pressure, with the lower portions of the sheet being interbonded. This technique improves the technology of the '473 patent by combining abrasion resistance, softness, dyeability and moldability.

However, there remains a need for composites that concentrate the adhesive or resin at the abrasion-resisting face for optimum softness and cost, and allow for the construction of thicker or multi-layer structures that, in addition to abrasion resistance, can provide secondary functions such as cushion, comfort, fluid absorption, moisture transport, and the like:

SUMMARY OF THE INVENTION

The method for making the composite material of the present invention comprises the formation of an abrasion-resistant, surface-consolidated fiber/resin layer on the back face of a staple-fiber web, needle-punched with a high count of needle penetrations per unit area, preferably through a layer of adhesive or low melt resin, or through a layer containing adhesive or low-melt resin. Alternately, the resin or adhesive is applied after needling. The back-face is subsequently consolidated or otherwise treated with pressure and heat. The melting point of the fibers in the webs is significantly higher than the melting point of the resin, so that after the consolidation or treatment, the fibers remain distinguishable from the resin and retain their physical properties. The fibers within the consolidated thin back-face layer are oriented substantially in the direction normal to the sheet. The staple-fiber web preferably comprises at least in part low average denier and/or small average cut length. The needled adhesive layer is preferably shrinkable, and the composite is preferably shrinkable by at least about 20% in at least one direction to increase the density of fibers oriented in the direction normal to the sheet. Resin is substantially confined to a depth of about 0.5 mm. The remainder of the sheet remains substantially free of surface-resin or adhesive.

It is to be understood that both the foregoing general description and the following detailed description are exemplary and explanatory only and are intended to provide a further explanation of the present invention, as claimed.

BRIEF DESCRIPTION OF THE DRAWINGS

In the accompanying drawings, which form a part of the specification and are to be read in conjunction therewith and in which like reference numerals are used to indicate like parts in the various views.

DETAILED DESCRIPTION

Figure 1:
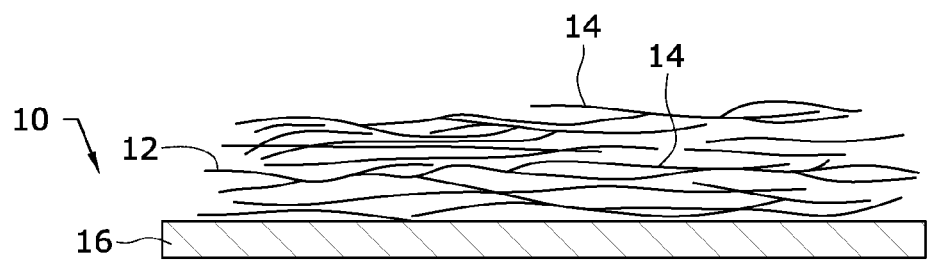
FIG. 1 is a schematic cross-sectional view of a non-woven face layer positioned on top of a shrinkable and preferably adhesive layer.

Needle-punching technique is fully described in one embodiment of parent application Ser. No. 10/611,769, wherein a durable and soft upper fabric face is achieved by needle-punching a web of staple fibers to create appended individual fiber "legs" originating from the exposed upper face and anchored in a layer of adhesive or low-temperature-melting resin placed on the opposite back-face. In a preferred embodiment of the parent case, the adhesive or low-melt resin is in the form of a sheet penetrated by the needle-punched "legs".

The inventor has determined that if the backside of the needle-punched composites or the side opposite from the needle entries is consolidated with heat and pressure, a thin consolidated layer with abrasion resistance is obtained with abrasion resistant properties similar to the "densified layer" on the top side of the composite discussed in co-pending '208 application. Unlike the composite disclosed in the '208 application however, the remainder of the composite of the present invention is substantially free of adhesives. Abrasion resistance is unexpectedly high when the fiber legs are formed using a staple web containing a high count of finer and shorter staple fibers, and when the needle penetration count of the final product exceeds 40/cm². The composite remains relatively flexible and conformable, irrespective of the thickness of the upper layers away from the thin dense layer that are free of resin or adhesive originating from the needle-punched adhesive/resin layer.

Additionally, the density of fiber legs penetrating the resin or adhesive layer per unit area, and, therefore, the abrasion resistance of the composite can be further improved if the needle-punched composite is shrunk. Furthermore, when the needling is performed in stages, with separate layers of fine and short staple fibers added at each stage, the density of the descending fiber legs per unit area and the abrasion resistance of the back-side of the composite improve further.

Also, preferably the melting point of the fibers of the face layer is about 10° C. to about 30° C. higher than the melting point of the adhesive, so that during the consolidation stage the fibers are not melted and retain their physical properties. The needling process positions the fiber legs in a substantially normal or perpendicular to the composite or to the adhesive layer. According to the present invention, the orientation of the fiber legs relative to the adhesive layer remains substantially unchanged during the consolidation process. Without being bound to any particular theory, the inventor believes that the relative high count of fiber legs, e.g., above about 40 penetrations/cm², and the substantially perpendicular orientation of the fiber legs within the consolidated resin-fiber layer contribute to the abrasion resistance of composites according to the present invention.

One exemplary method for making composites according to the present invention includes the steps of:

providing a non-woven layer containing fine-denier staple fibers under about 6.6 decitex, preferably under about 1.0 decitex, having relatively short length of less than about 5 cm;

providing a sub-layer containing low melt thermoplastic resin or thermoset adhesive;

needle-punching the non-woven layer into and through the sub-layer in at least one web-laying and needle-punching step;

applying heat and pressure to the back-side, opposite to the needle entrance side, to melt the low melt resin or to set the thermoset adhesive and to form a thin and consolidated and interbonded layer on the back-face of the composite having a depth of resin or adhesive penetration between about 0.2 and about 1.0 mm, preferably under about 0.5 mm, and a volumetric density over about 0.8 gms/cm³, wherein the final accumulated count of needle penetrations in the composite sheet exceeds 40/cm², and the final fiber-end count in the composite exceeds 2,000/cm².

Decitex is a unit for measuring yarn and 1 decitex=1 gram per 10,000 meters of yarns.

In a second preferred embodiment the sub-layer containing low-melt resin or thermoset adhesive is shrinkable, and the composite is shrunk by at least 20% in at least one direction prior to consolidation. In third and fourth embodiments, analogous to the first and second embodiments respectively, the needling is first performed and the adhesive or resin is applied after needling, or after needling and shrinking.

Shrinking may be achieved by using a separate shrinkable layer containing no resin or adhesive as a layer to be needle-punched. The shrinkable layer may be positioned between the top fibrous layer and the adhesive layer. Alternatively, the fibrous layer can be a blend with shrinkable fibers, so that shrinking of the composite is achieved through the shrinking of the top fibrous layer. Preferably, the shrinking is accomplished by the resin or adhesive layer.

The preferred fiber-end and needle penetration count can also be achieved in one fiber-laying step and one needling step, or accumulated with multiple fiber-laying and needling steps. The final fiber-end and needle-punch density or count is defined as the sum of the counts of each step, multiplied by the ratio of the initial surface area to the final surface area. The resin layer, if used, includes, or consists entirely of, a lower-melting thermoplastic material with melting point in the range of 160° C. and 220° C. and with relatively low melt viscosity, which envelops the normally-oriented "fiber-legs" within the consolidated layer. Alternately, the resin layer contains thermosetting adhesive materials that do not activate at lower temperatures used during the shrinking step, but do activate subsequently at higher temperatures during the formation of the thin dense layer. The resin layer may also be the shrinking layer, or another shrinkable layer may be provided.

Alternatively, the needle-punching process can be repeated after the shrinking step and before the consolidation step to stabilize the fibrous face of the composite (i.e., the same side as the previous needle entry side) and to increase the total density of needle penetrations per unit area. The additional needling may be preceded by the addition of more staple fiber webs or more staple fibers on the top face of the composite or by the addition of one or more resin layers on the bottom of the composite. After the consolidation step, the composite may be embossed under heat and pressure, or the composite may undergo additional consolidation steps.

In the embodiments where the "fiber legs" have been driven through one resin or adhesive-containing sub-layer, additional layer(s) of low-melt resin or adhesive can optionally be added onto the back-face prior to consolidation. More than one consolidation (e.g., heat and pressure) step can also optionally be used, adding layers of resin or adhesive during each step. The additional adhesive can be in the form of films, fabrics, powders, fibers, fibrils, suspension of powders, liquid or liquefied form. The first low-melt resin or adhesive containing sub-layer used during the needle-punching step introduces the resin or adhesive into the roots of the descending "legs", stabilizes the "legs", and minimizes the collapse of these "legs" during consolidation, or during the addition of subsequent layers of adhesive or low melt resin, if any. The multi-step resin/adhesive application technique can also be useful for building up resin weight with thermoplastic low-melt resin sheets, because it divides the total resin weight into two or more parts, one deployed during needling and the others after needling, and avoids the need to drive the needles through a single heavy resin sheet. The first adhesive/resin sublayer can also provide a thin barrier that can control the depth of penetration of the additional optional adhesive into the fibrous top layer after needling and before consolidation.

The needle-punched web of any of the embodiments of this invention may also contain staple fibers coarser than about 6.6 decitex, continuous-filament fibers, or continuous-filament nonwoven layers, or immobile bonded nonwoven layers or other fabric layers or films, provided that these added elements are penetrated by the needles without substantially damaging their structure and properties, and do not prevent the finer fibers from being needled through and form the fiber legs on the back-face.

The method of the present invention provides a composite material that has a Wyzenbeek abrasion resistance of at least 2000 cycles for 80-grit paper and preferably at least 4000 cycles, with the composite weighing approximately from about 200 to about 2000 g/m$^2$, and having a thickness of about 0.5 to about 10 mm.

The invention also comprises an optional step of abrading or cold-embossing with a tool having a rough surface with sharp projections to create micropores thereon. As a result of these treatments the composite acquires a hydro-head penetration resistance of at least 10 cm of water and a vapor escape rate of at least about 100 mg per 24 hours.

Figure 2:
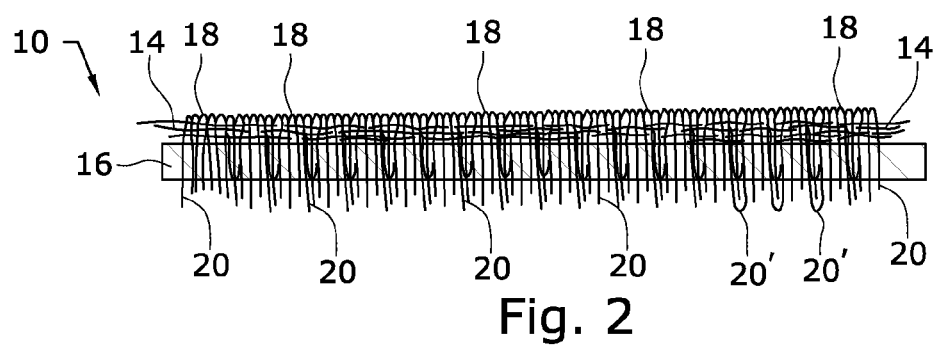
FIG. 2 is a schematic cross-sectional view of the layers of FIG. 1 after being needle-punched.
Figure 3:
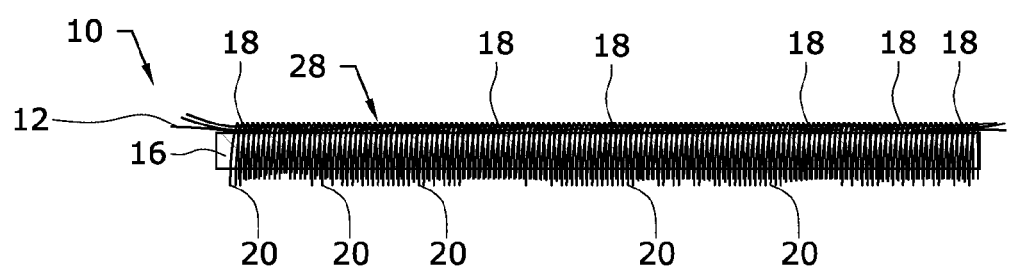
FIG. 3 is a schematic cross-sectional view of the composite of FIG. 2 after being shrunk.

Referring initially to FIG. 1, the precursors to an abrasion resistant composite 10 in accordance with one embodiment of the present invention include fibrous face layer 12 containing a plurality of primarily unbonded and unentangled staple fibers and/or webs of staple fibers 14 and a layer 16. Precursor 12 is then needle-punched so that staple fibers 14 originating from the uppermost strata of layer 12 form primary upper loops 18 and legs 20, as shown in FIG. 2. Legs 20 consist mainly of free fiber ends. The needles will also drive through occasional secondary inverted loops 20'. In this application both the fiber ends and the inverted secondary loops driven through layer 16 are referred to collectively as "legs". The density of "legs" will increase with decreasing denier (measured in decitex) as the area density or area count of available fibers and fiber ends increases. With decreasing staple length, the number of fibers and fiber-ends also increases and simultaneously the resistance to be driven through by the needles either as a free-end or as an inverted secondary loop decreases. Loops 18 and legs 20, 20' are dependent on face layer 12, and legs 20, 20' are driven through layer 16. Preferably composite 10 is also heated to shrink shrinkable layer 16 and further increase the area density or count of embedded legs 20, 20' within shrinkable layer 16, as illustrated in FIG. 3. The composite illustrated in FIGS. 1 and 2 is fully disclosed in parent U.S. patent application Ser. No. 10/611,769, which has been incorporated by reference in its entirety above.

Fibers 14 are preferably relatively short, low decitex staple fibers, so that the number of low-decitex fiber-ends available to be inserted through layer 12 into layer 16 is high, and consequently, after face layer 12 is needle-punched, the density of legs 20 is high. Preferably, fibers 14 comprise fibers of less than about 6.6 decitex, more preferably less than 3.3 decitex, and most-preferably less than 1.0 decitex. Preferably, fibers 14 are up to about 5 cm long, preferably less than about 2.5 cm, or shorter. Fibers over 6.6 decitex and longer than 5 cm generally contribute less to abrasion resistance.

Face layer 12 of the composite may also contain additional elements such as coarser fibers, longer fibers contributing fewer free ends, continuous-filaments, and continuous-filament nonwovens which contribute virtually no free ends. It may also include highly-bonded or highly-entangled nonwovens in which the fibers are not free to be pushed through by the needles, or reinforcing scrims, or layers of foam, and other similar elements, all of which have no significant effect on abrasion resistance so long as the fine and short fibers can be needle-punched through. Preferably, the number of fiber ends less than 6.6 decitex contained in the final composite exceeds 2,000/cm$^2$, and the accumulated count of needle-penetrations exceeds 40/cm$^2$. Preferably, the finer and shorter fibers are placed on top of all other fibers or layers prior to needle-punching. As a self-correcting feature in cases where the finer and shorter fibers are blended-in with coarser fibers, the coarser fibers, and especially the coarser and longer fibers, if any, tend to be mostly bypassed by the needles, and consequently the fibers penetrating layer 16 are predominantly the finer and shorter fibers. Blending nevertheless reduces "leg" density and abrasion resistance to some extent, as compared to the placement of the finer fibers on top. The process of this invention preferably uses long needle penetration strokes, i.e., around 12-15 mm.

Suitable staple fibers for the process of this invention include, but are not limited to, polyester fibers, polyamide fibers, aramid fibers, and other fibers that do not melt or soften at temperatures under 150° C., more preferably can stay intact above 225° C.

Fibers 14 are usually arranged in a generally planar pattern in face layer 12 as in the case of lapped carded webs, and as shown in FIG. 1. Alternatively, some of the fibers may be arranged in more random orientations as in the case of airlaid webs. The accumulated final needling density reaches at least about 40 penetrations per cm$^2$ and can reach as high as 300 penetrations per cm$^2$. In one exemplary embodiment, the needle punch density is about 90 penetrations per cm$^2$ prior to shrinking. After shrinking about 50%, the density is increased to at least about 180 penetrations per cm$^2$. Multiple webs 12 and multiple needling steps can be used to accumulate the preferred final fiber-end density and the preferred needle penetration density. The final needle-penetration density is calculated as the sum of the individual densities divided by the shrinkage ratio. The use of fresh unbonded and unentangled layers of fibers laid on top before each needling step is advantageous in improving the density of the appended legs, and, in turn, the abrasion resistance of the composite.

Layer 16 contains a thermoplastic or thermoset adhesive, so that after composite 10 is shrunk legs 20, 20' are embedded and held within layer 16. Preferably, layer 16 consists of a shrinkable thermoplastic polymer. Alternatively, layer 16 can contain thermoset adhesive, provided that the heat-shrinking process discussed above does not prematurely cure the adhesive. Particularly suitable thermoplastic adhesives include, but are not limited to, extruded shrinkable films of polyethylene. Layer 16 can contain as little adhesive as 50 g/m$^2$ and as much as 500 g/m$^2$, preferably 100 to 250 g/m$^2$.

Layer 16 should preferably be capable of shrinking in area by about at least 20% and, more preferably by about 50% preferably at a temperature of from about 25° C. to about 40° C. below the adhesive melting or heat-setting point. An exemplary and preferred shrinkable low-melting material is extruded polyethelene film which shrinks at a temperature of from about 130° C. to about 160° C., and contributes the shrinking force required to shrink the entire composite. It can be then be melted and brought to a very low level of melt-viscosity at temperatures in the range of 175 to 225° C., without detectable polymer degradation, and without affecting web fibers made of polyesters, polyamides or aramids. Other exemplary adhesive materials include, but are not limited to polypropylene, low-melting copolyesters, and/or copolyamides, or low-melt urethanes.

Layer 16 is most preferably a colored polyethylene film, e.g., black. More preferably, the color of the polyethylene film is the same as the color of fibers 14, so that in actual use the partially abraded areas do not look significantly different from the rest of the surface. Layer 16 of the present invention can also contain one or more of the other adhesive materials listed above. Other suitable shrinkable and/or adhesive layers include low-melting fabrics, and in particular low-melting nonwovens, such as nonwovens containing polyolefins or nonwovens containing a relatively high percentage of low-melting binder fibers. One example of such an adhesive layer is a flat and relatively thin bonded nonwoven layer constructed from polyolefin fibers. Such layers tend to shrink significantly at 150-175° C. and do not interfere with the action of the needles.

Figure 4:
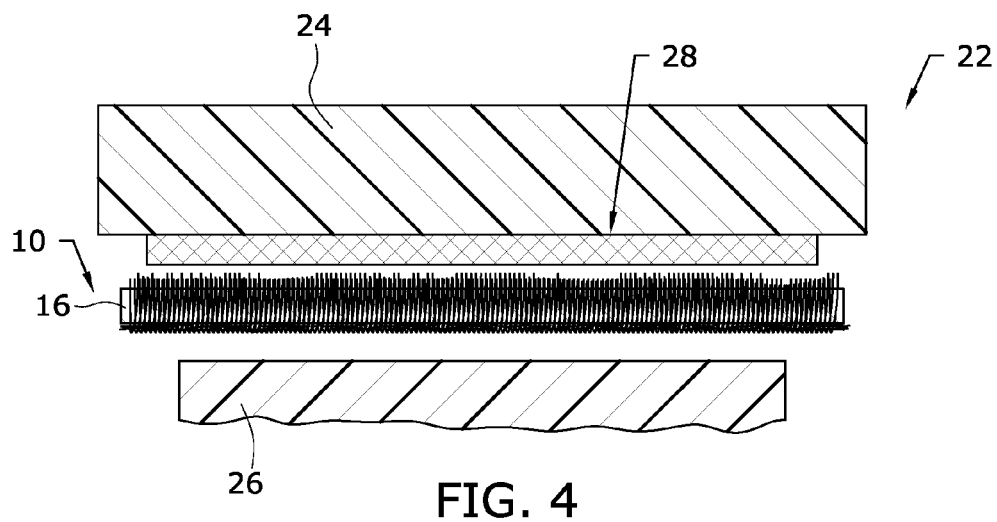
FIG. 4 is a schematic cross-sectional view of the composite of FIG. 3 and an exemplary heated press.

After composite 10 is shrunk to increase the density of embedded legs 20, composite 10 is heated under pressure as shown in FIG. 4. Press 22 comprises upper platen 24 and lower platen 26. As illustrated, composite 10 is turned upside down so that layer 16 is positioned upward to face heating element 28 attached to upper platen 24. The orientation of composite 10 can be reversed and heating element 28 can be attached to lower platen 26. The shrunk composite 10 of FIG. 3 can also be finished through a heated calender, with the heated surface facing the adhesive side of composite 10, and the opposite roll kept at room temperature or lower temperature.

Figure 5:
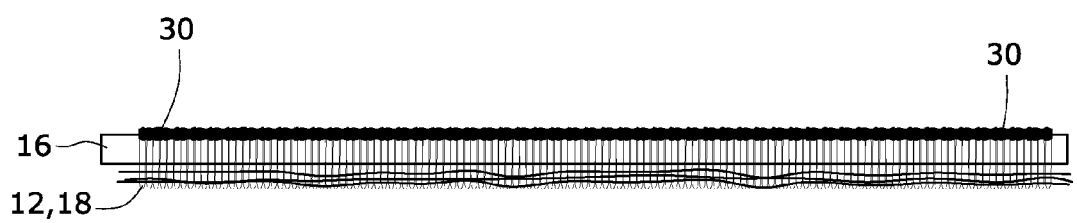
FIG. 5 is a schematic cross-sectional view of the composite of FIG. 3 after heat and pressure are applied to the bottom thereof.

The applied heat and pressure create a consolidated surface layer 30 on layer 16, which is a thin composite fiber and resin layer, as shown in FIG. 5, while fibrous layer 12 and loops 18 remain substantially unchanged. Surface layer 16 comprises legs 20, 20' and molten adhesive and has higher density than the rest of composite 10. The pressure applied by press 22, or by an equivalent calender, and the temperature of heating element 28, or an equivalent heated calender roll, can be adjusted depending on the materials and thickness of layer 16 to create consolidated surface layer 30. The softness of composite 10 is affected by the thickness of consolidated layer 30. Thinner consolidated layers 30 produce softer composites 10. As used herein, consolidated layer 30 is a layer or skin of rich resin and fibers with the fibers predominantly oriented in the direction normal to the sheet formed on the surface of the composite by heat and pressure.

Figure 10:
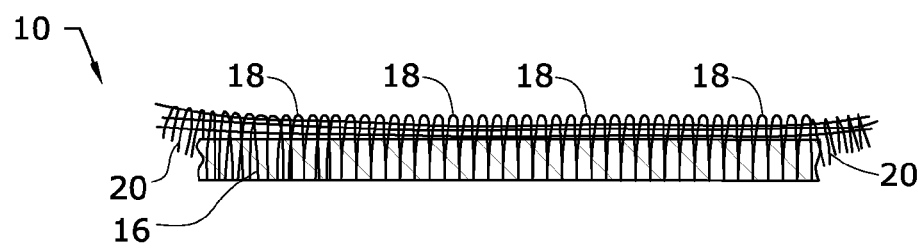

In another embodiment shown in FIGS. 7-10, adhesive layer 16 is added after face layer 12 is needled. The needled web of FIG. 8 can also be shrunk after needling, and before the application of adhesive shown in FIG. 9. Adhesive layer 16 can be laminated to needle-punched layer 12 or adhesives in powder, fibril, fiber or liquid/liquefied form can be applied and activated to embedded legs 20, 20' as shown in FIG. 10.

Figure 11:
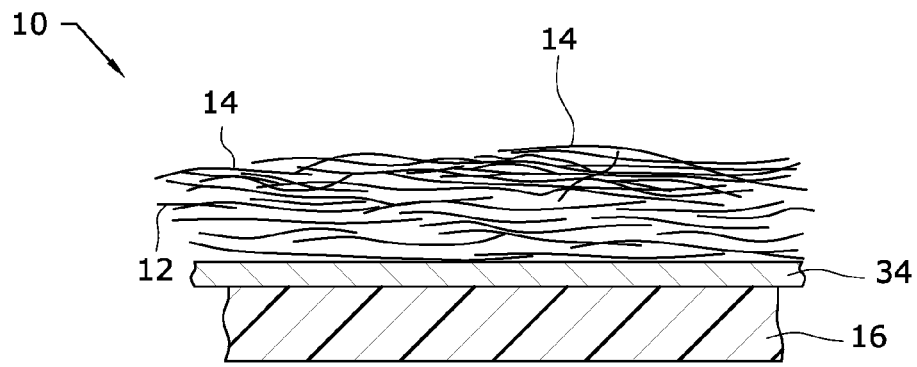
FIGS. 11-13 are schematic cross-sectional views of another composite in accordance to the present invention.
Figure 12:
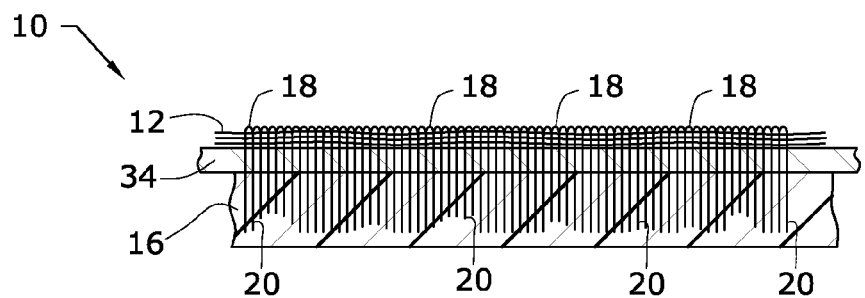
Figure 13:

Another embodiment is shown in FIGS. 11-13. Here, composite 10 also comprises optional intermediate layer 34. Intermediate layer 34 can be a fibrous layer made from flat or textured yarns, a re-enforcing layer, a thermal insulator, a fire-retardant material, an anti-bacterial material, a foam layer to absorb impact, or can have any desirable property. Fibers 14 are needle-punched through both layers 16 and 34, and legs 20 can protrude out of layer 16, as discussed in the other embodiments, or the depth of penetration is adjusted so that legs 20 do not protrude. After composite 10 is shrunk and exposed to heat and pressure, consolidated skin 30 is formed as shown in FIG. 13. More than one intermediate layer 34 can be incorporated in the composite without affecting the formation of the abrasion-resistant layer.

The composite of this invention can weigh as little as 200 g/m$^2$ and as much as 1500 g/m$^2$, with an overall thickness as small as about 0.5 mm and as large as about 10 mm. Flexible "leather-like" embodiments of this invention weigh approximately 250-750 g/m$^2$ and have an overall thickness between about 0.5 and about 2.5 mm, with the adhesive within the dense back-layer representing 30-70% of their weight, and with the fibers consisting mainly of fibers under 1.5 decitex, having an area density of 2,000-20,000 ends per cm$^2$. The fiber ends count is preferably greater than about 2,000 ends per cm$^2$ and more preferably greater than about 3,000 ends per cm$^2$. Thin reinforcing layers of bonded nonwovens or thin scrims can be deployed within this type of structures without unduly stiffening the composite.

Heavier, other embodiments of this invention can include various additional elements such as coarse and resilient fibers, or layers of foam for adding cushion, various scrims or warps or fabrics to add strength dimensional stability, absorbent or repellent layers designed to control moisture movement, active layers containing antimicrobial, odor absorbing or gas absorbing elements, and the like. These elements are selected so that they do not interfere with the needle-punching process. Depending upon the choice of such extra layers, the composite weight may be above 1000 g/m$^2$, and its thickness well above 5 mm.

The embodiments of this invention have a Wyzenbeek abrasion resistance above 2,000 cycles, using 80 grit paper, and as much as 10,000 to 20,000 cycles. Unless reinforced with a stiff scrim they are also moldable.

Figure 6:
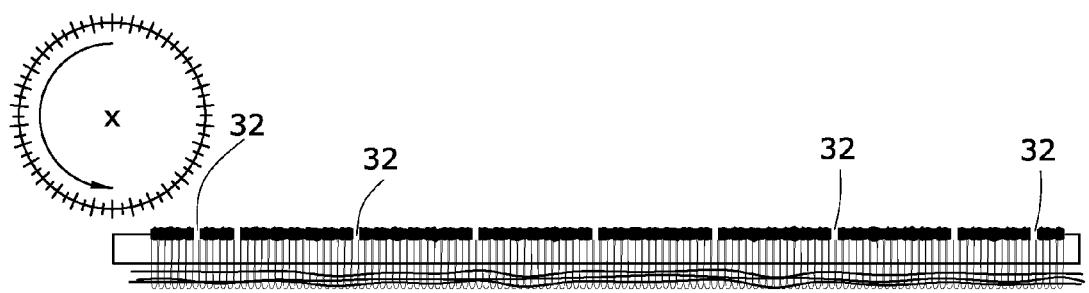
FIG. 6 is a schematic cross-sectional view of composite of FIG. 5 being sanded to create micro-pores in the composite (not shown to scale)
Figure 7:
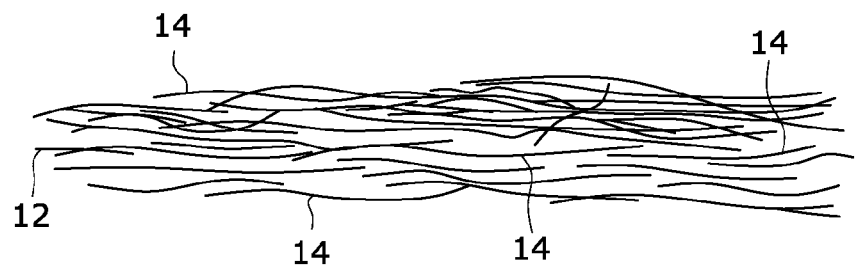
FIGS. 7-10 are schematic cross-sectional views of another composite in accordance to the present invention.
Figure 8:
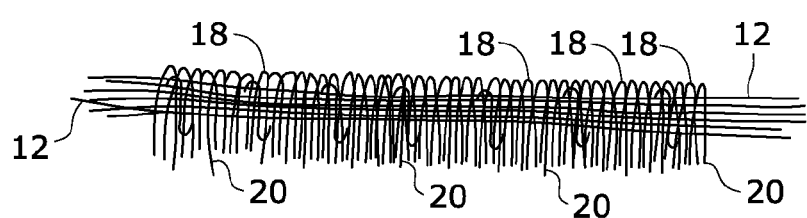
Figure 9:
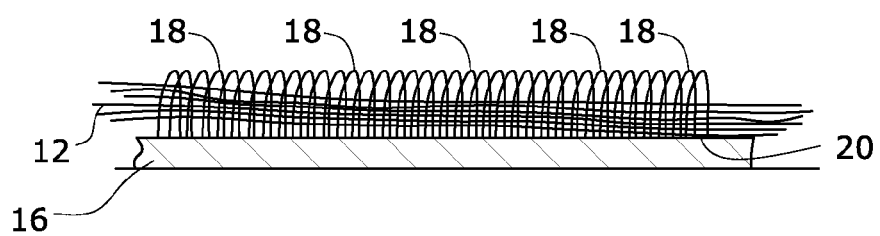

Consolidated layer 30 can also be sanded to create micropores 32 as shown in FIG. 6 (not drawn to scale). Unexpectedly, pores 32 opened by lightly-sanding with fine grit abradants (under 100 grits), have diameters that allow the passage of gases such as water vapor and air, but block liquids such as water, unless the liquids are under relatively high pressure. Particularly effective are polyolefin-containing consolidated skins, which are hydrophobic. Such sanded consolidated skins or layers block water under a pressure of at least 10 cm of water column, and usually above 30 cm, while allowing the escape of at least 100 mg of evaporated water in 24 hours. The light sanding appears to abrade the thin solid face-membrane on skin 30, and to expose or break some of the embedded fine fibers, opening pores that appear to be in the same order of magnitude as diameter of the fine fibers discussed above. Consolidated thin skin 30 can also be perforated with very fine holes if pressed at room temperature with abrasive sheets covered with sharp-edged abrasive particles in the range of 40-80 grits.

Composite 10, shown in FIG. 5 or 13 can also be embossed at higher temperatures to form textured surfaces. Textured heated plates or heated calender rolls can also be used directly to create an embossed and textured surface directly during the consolidation step

EXAMPLES

Example 1

Fine Denier Fibers Needled into a Shrinkable Adhesive Layer

Polyester staple fibers 1.0 decitex and 0.85 inches or 2.1 cm long are carded, cross-lapped into a web weight of 2.5 oz/yd$^2$ or 85 g/m$^2$ (approximately 8000 ends per cm$^2$), and needle-punched into a black polyethylene film, 6.5 mils or 0.16 mm thick, weighing 4.3 oz/yd$^2$ or 146 g/m$^2$, with 550 penetrations/m$^2$ or 88/cm$^2$, using 3-barb needles penetrating 14 mm beyond the lower needling plate. The composite is then heated to 190° C. by overfeeding onto the carrier belt of a continuous oven. The composite shrinks in the machine direction to approximately ½ of its length due to the stresses locked in the extruded film. The adhesive film is available from AEP, LLC, Charlotte, N.C.

The shrunk composite is pressed with 1,000 lbs/inch$^2$ for less than ½ second using a hot press, with the platen facing the backside raised to 220° C., and the other platen held at room temperature. The black polyethylene resin flows sufficiently to cover the back face totally and envelop substantially all surface fibers. The resin penetrates only approximately 0.35 mm into the 1.3 mm thick sheet. The density of the clearly-visible resin-containing consolidated layer is calculated by adding the resin weight within the clearly visible 0.35 mm layer (approximately 146×2 or 292 g/m$^2$), to the portion of the fibers within the 0.35 mm layer assuming equal distribution of fiber weight across the 1.3 mm thickness, (0.35/1.3 or 3.5/13ths of the fiber weight, or 85×2×3.5/11 or 46 g/m$^2$). This calculation yields a layer density of 0.89 g/cm$^3$, indicating very low layer-porosity, near 10%, considering that the density of polyethylene which constitutes 292/(292+46) or 86% of the layer weight is approximately 0.9 g/cm$^3$, and that of polyester constituting 14% of the layer weight is approximately 1.4 g/cm$^3$. A non-porous layer containing these two materials in these proportions would have an approximate density of 1.02 g/cm$^3$.

The sheet weighs approximately 14.3 oz/yd$^2$ or 486 g/m$^2$, and it has a Wyzenbeek abrasion resistance above 4000 cycles, without any significant sign of abrasive penetration through the black resin layer within the abraded area. The final free-end count of fibers under 6.6 decitex is approximately 16,000/cm$^2$, and the final density of needle penetrations is 176/cm$^2$. The product is leather-like, flexible, and also moldable. The back-face is solid, does not breathe and can withstand high water pressure without leaking through.

The product is lightly abraded throughout the back face using 100-grit paper. A very subtle and soft fibrous feel develops on the backside. After the 100-grit treatment, the product can withstand at least 30 cm of water head without leaking, while it allows at least 150 milligrams of water evaporation through over 24 hours, Example 2

Higher Denier/Lower End Count

Example 1 is repeated using 3.3 decitex, 1.5 inches or 3.75 cm long polyester staple fibers (1360 ends per cm$^2$ at the start and 2,720 at the end). Process and product characteristics are very similar to those of Example 1, except that abrasion resistance is down to approximately 2,000 cycles.

Comparative Example 3

(Example 2 is repeated using 6.6 decitex 3 inches or 7.5 cm long polyester fibers (340 ends per cm$^2$, at the start and 680 at the end). The resultant product is bulkier, but otherwise similar to that of Examples 1 and 2. Abrasion resistance falls to approximately 600 cycles, and outside the range of the present invention.

Example 4

Adhesive or Resin/Post-Applied, No Shrinkage

Example 1 is repeated, except that web's weight is doubled, and the needling frequency is nearly tripled. No resin or adhesive sublayer is deployed during needle-punching, and no shrinking takes place. Two layers of film are applied to the backside during the consolidation step. The resin does envelop the surface fibers, arid penetrates roughly to the same depth as in Example 1. The composite is thinner overall and its abrasion resistance less than Example 1.

Example 5

Basic Shrunk Product with Added Thin Reinforcement Layer

Example 1 is repeated adding a layer of bonded reinforcing card web weighing approximately 25 g/m$^2$ between the web and the adhesive film prior to needle-punching. The reinforcing web, obtained from HDK, Inc. of Rogersville, Tenn., contains 40% 1.65 decitex/1.5 inch polyester and 60% 2 decitex/1.5 inch sheath-core binder fibers, with the sheath melting at 110° C. Prior to use, the card web is fully bonded and stiff. The barbed needles appear to essentially bypass this web, pushing the 1.0 decitex free fibers through this web and the film. The composite shrinks by a ratio of 2:1 when subjected to 190° C. The final properties are essentially similar to those of Example 1, with the exception of a slightly higher basis weight and significantly higher cross-directional tear strength.

Example 6

Two-Stage Needling Followed by Shrinkage

Example 1 is repeated, except that two webs, each having one half the original weight are sequentially needle-punched, using one half of the original needling density at each stage. The shrinking and consolidation processes yield a final product with properties similar to those in Example 1, except for significantly higher abrasion resistance.

Example 7

Two-Stage Needling, No Shrinkage

Example 5 is repeated, except that the web weights and the needling frequencies at each needle-punching stage are doubled, the shrinking step is omitted, no adhesive film is added during the second needle-punching stage, but a second layer of film is added to the backside before consolidation. Properties essentially match those of Examples 1 and 6, with the abrasion resistance comparable to Example 1 but less than Example 6.

Example 8

Heavier Structure Containing Multiple Reinforcing and Cushioning Elements, No Shrinkage, Multistage Neeedling Example 6 was repeated with the addition of several optional functional layers behind the abrasion-resistant layer, including a cushioning layer of polyurethane foam weighing 68 g/m$^2$, a strength-enhancing layer consisting of a woven scrim of 10×10 cotton weighing 85 g/m$^2$, and an absorbent layer consisting of a well entangled spunlaced nonwoven (Style 8411 Sontara from E.I.DuPont) containing absorbent rayon fibers weighing 40 g/m$^2$. These layers were placed in the above order over the polyethylene film and under the 1.0 decitex web. The final product was heavier and thicker, but the character of the abrasion-resistant skin was essentially similar to Example 1.

Example 9

Abrasion Resistant Layer on a Blended Coarse and Fine Fiber Cushioning Batt, No Shrinkage A blend of 35% 1.0 decitex/2.1 cm polyester staple and 65% black 16.5 decitex/5cm polyester staple was carded and cross-lapped into a 20 oz/yd$^2$, or 680 g/m$^2$ web, and needle-punched into a red 6.5 mil/148 g/m$^2$ polyethylene film using a total of 1,100 penetrations per square inch, or 176 penetrations/cm$^2$. The fiber legs penetrating through the red film were mostly white, indicating that the needles filled their barbs with the finer and shorter fibers and bypassed the coarse fibers. A second 6.0 mil/146 g/m$^2$ white polyethylene film was placed on the needle exit side of the composite and laminated with 1000 psi pressure at 220° C. for 1.5 seconds. A thin consolidated skin, 0.4 mm thick was formed with the two films penetrating into the web. The composite had a total thickness of 4.4 mm, and a pronounced cushioning character. The abrasion resistance of the consolidated face was satisfactory but less than Example 1.

The results from Example 1-9 are summarized in Table 1, below.

TABLE I

| | EXAMPLE | | | | | | | | |
|---|---|---|---|---|---|---|---|---|---|
| | 1 Single Shrunk Web | 2 Higher denier fibers | 3 Comparative Prior Art | 4 Post-Applied Resin | 5 Reinforced & Shrunk | 6 Two-Stage Needled & Shrunk | 7 Two-Stage, No Shrinkage | 8 Multiple Reinforcing No Shrinkage | 9 Blended Cushion |
| WEB #1 | | | | | | | | | |
| DTX/CUT, cm | 1.0/2.1 | 3.3 × 3.75 | 6.6 × 7.5 | 1.0/2.1 | 1.0/2.1 | 1.0/2.1 | 1.0/2.1 | 1.0/2.1 | 15/2.3, 1.0/2.1 |
| Wt, g/m$^2$ | 85 | 85 | 86 | 173 | 87 | 43 | 86 | 86 | 544 |
| Ends/cm$^2$ | 8000 | 1360 | 340 | 16000 | 8000 | 4000 | 8000 | 8000 | 15360 |
| Penetrations/cm$^2$ | 88 | 88 | 88 | 216 | 88 | 44 | 88 | 88 | 176 |
| PE FILM Wt, g/m$^2$ | 146 | 146 | 146 | NONE | 146 | 146 | 146 | 146 | 146 |
| INSERT | NONE | NONE | NONE | NONE | 25 gm NW | None | 25 gm NW | FOAM/SCRIM SPUNLACED | NONE |
| WEB #2 | | | | | | | | | |
| DTX/Cut, cm | — | — | — | — | — | 1.0/2.1 | 1.0/2.1 | 1.0/2.1 | — |
| Weight gm/m$^2$ | — | — | — | — | — | 43 | 88 | 88 | — |
| Penetrations/cm$^2$ | — | — | — | — | — | 44 | 88 | 88 | — |
| SHRINK, ° C. | 190 | 190 | 190 | — | 190 | 190 | — | — | — |
| SHRINK RATIO | 2/1 | 2/1 | 2/1 | — | 2/1 | 2/1 | — | — | — |
| FINAL Ends/cm$^2$ | 16,000 | 2,720 | 680 | 16,000 | 16,000 | 16,000 | 16,000 | 16,000 | 16,000 |
| FINAL, Pen/cm$^2$ | 176 | 176 | 176 | 216 | 176 | 176 | 176 | 176 | 176 |
| Consolidation. ° C. | 220 | 220 | 220 | 220 | 220 | 220 | 220 | 220 | 220 |
| Pressure psi | 1000 | 1000 | 1000 | 1000 | 1000 | 1000 | 1000 | 1000 | 1000 |
| Time, seconds | >0.5 | >0.5 | >0.5 | ~1.0 | >0.5 | >0.5 | >0.5 | >0.5 | ~1.0 |
| EXTRA FILM g/m$^2$ | — | — | — | 2 × 146 | — | — | 146 | 146 | 146 |
| THICKNESS, mm | 1.3 | 1.5 | 1.8 | 0.7 | 1.5 | 1.3 | 1.2 | 3.8 | 4.4 |
| WT, g/m$^2$ | 486 | 500 | 515 | 506 | 545 | 490 | 495 | 570 | 701 |
| RESIN, DEPTH/mm | 0.35 | 0.35 | 0.35 | 0.35 | 0.35 | 0.40 | 0.35 | 0.40 | 0.40 |
| WYZENBEEK | >6000 | ~2000 | ~600 | ~3000 | >6000 | >8000 | >5500 | >5500 | >5000 |

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A process for forming an abrasion-resistant composite comprising the steps of:
   a. providing at least one fibrous layer, wherein a portion of the fibrous layer comprises staple fibers of about 6.6 decitex or less;
   b. providing a first layer of adhesive to the fibrous layer, wherein the melting point of the staple fibers is higher than the melting point of the resin;
   c. needle-punching each said at least one fibrous layer through said first layer of adhesive by driving a plurality of said staple fibers through said first layer of adhesive so that the driven staple fibers are held within the adhesive layer in substantially the normal position; and
   d. applying heat and pressure to the composite from the side opposite to the needle entries to form an abrasion resistant consolidated back-face layer of comprising adhesive and the driven staple fibers, by melting the adhesive and enveloping the driven staple fibers with the molten adhesive;

wherein the count of said fiber ends is at least about 2,000/cm$^2$ and the density of needle-punching penetrations is greater than about 40 penetrations/cm$^2$, and the Wyzenbeek abrasion resistance of the abrasion resistant consolidated back-face layer is higher than about 2,000 cycles using 80-grit abrasive paper.

2. The process of claim 1 further comprising the step of shrinking the composite by at least 20% in at least one direction.

3. The process of claim 2, wherein the fibrous layer is shrunk.

4. The process of claim 1, wherein step (b) comprises providing a second adhesive layer.

5. The process of claim 4, further comprising the step of shrinking the second adhesive layer by at least 20% in at least one direction.

6. The process of claim 1, wherein additional adhesive is applied to the back side of the composite before step (d).

7. The process of claim 1, further comprising the step of limiting the penetration of adhesive into the fibrous layer to less than about 0.5 mm.

8. The process of claim 1, wherein each fibrous layer is needle-punched before the next fibrous layer is provided and needle-punched.

9. The process of claim 1 further comprising the step of abrading at least a portion of the consolidated back-face layer.

10. The process of claim 9, wherein the abrading step comprises a sanding step.

11. The process of claim 1 further comprising the step of forming micro-pores on the consolidated back-face layer.

12. The process of claim 1 further comprising the step of providing at least one additional layer between the fibrous layer and the adhesive.

13. The process of claim 12, wherein said at least one additional layer comprises higher denier staple fibers, continuous filament fibers, bonded nonwoven, woven or knit fabrics, flat or textured yarns, re-enforcing scrims, thermal insulators, fire-retardant materials, anti-bacterial materials, gas or odor-absorbing materials or cushioning layers.

14. The process of claim 1, wherein said staple fibers provide an accumulated count of at least 3,000 ends/cm$^2$.

15. The process of claim 2, wherein the composite is shrunk by at least about 40%.

16. The process of claim 1 further comprising the step of embossing the composite at an elevated temperature to produce a textured surface.

17. The process of claim 4, wherein the adhesive layer comprises a polyethylene film.

18. The process of claim 1, wherein step (c) occurs before step (b).

19. The process of claim 1, wherein the melting temperature of the stable fibers is about 10° C. to about 30° C. higher than the melting point of the resin.

20. The process of claim 2, wherein after the shrinking step the composite is needle-punched further before the applying heat and pressure step.

21. The process of claim 20, wherein additional staple fibers are added before the additional needle-punching step.

22. The process of claim 20, wherein additional adhesive is added to the composite before the additional needle-punching step.

23. The process of claim 1, further comprising the step of limiting the penetration of adhesive into the fibrous layer to between about 0.2 mm and about 1.0 mm.

24. The process of claim 1, wherein in step (a) the at least one fibrous layer comprises staple fibers of about 3.3 decitex or less.

25. The process of claim 24, wherein in step (a) the at least one fibrous layer comprises staple fibers of about 1.0 decitex or less.

26. The process of claim 1, wherein in step (d) the count of the fiber ends is about 20,000/cm$^2$ or less.

27. The process of claim 1, wherein in step (d) the count of the fiber ends is about 16,000/cm$^2$ or less.

28. The process of claim 1, wherein in step (d) the density of needle-punching penetrations is greater than about 90 penetrations/cm$^2$.

29. The process of claim 28, wherein in step (d) the density of needle-punching penetrations is greater than about 180 penetrations/cm$^2$.

30. The process of claim 29, wherein in step (d) the density of needle-punching penetrations is less than about 300 penetrations/cm$^2$.

31. The process of claim 1, wherein in step (d) the Wyzenbeek abrasion resistance is greater than 3,000 cycles.

32. The process of claim 31, wherein in step (d) the Wyzenbeek abrasion resistance is greater than 5,000 cycles.

* * * * *